United States Patent
Sandford et al.

(10) Patent No.: US 9,144,958 B2
(45) Date of Patent: Sep. 29, 2015

(54) SHEETS FOR USE WITH MEDICAL CONTAINERS

(75) Inventors: Craig Sandford, Buffalo Grove, IL (US); Mark Jones, Libertyville, IL (US)

(73) Assignee: Fenwal, Inc., Lake Zurich, IL (US)

( * ) Notice: Subject to any disclaimer, the term of this patent is extended or adjusted under 35 U.S.C. 154(b) by 378 days.

(21) Appl. No.: 12/914,565

(22) Filed: Oct. 28, 2010

(65) Prior Publication Data

US 2011/0097563 A1      Apr. 28, 2011

Related U.S. Application Data

(60) Provisional application No. 61/225,707, filed on Oct. 28, 2009.

(51) Int. Cl.
| | | |
|---|---|---|
| *B32B 7/02* | (2006.01) | |
| *B32B 27/32* | (2006.01) | |
| *B32B 27/16* | (2006.01) | |
| *B32B 27/22* | (2006.01) | |
| *A61J 1/10* | (2006.01) | |

(52) U.S. Cl.
CPC .............. *B32B 27/16* (2013.01); *B32B 27/22* (2013.01); *B32B 27/32* (2013.01); *A61J 1/10* (2013.01); *Y10T 428/2495* (2015.01); *Y10T 428/31855* (2015.04)

(58) Field of Classification Search
USPC ................................................ 428/213, 500
See application file for complete search history.

(56) References Cited

U.S. PATENT DOCUMENTS

| | | | |
|---|---|---|---|
| 4,326,025 A | | 4/1982 | Buckles et al. |
| 4,375,509 A | | 3/1983 | Buckles et al. |
| 4,451,259 A | | 5/1984 | Geissler et al. |
| 4,892,604 A | | 1/1990 | Measells et al. |
| 5,026,347 A | | 6/1991 | Patel |
| 5,066,290 A | * | 11/1991 | Measells et al. ............... 604/408 |
| 5,079,002 A | | 1/1992 | Nagai et al. |
| 5,100,401 A | | 3/1992 | Patel |
| 5,167,657 A | | 12/1992 | Patel |
| 5,248,531 A | | 9/1993 | Nagai et al. |
| 5,993,949 A | * | 11/1999 | Rosenbaum et al. .......... 428/213 |
| 6,187,400 B1 | * | 2/2001 | Woo et al. ..................... 428/36.6 |
| 6,969,483 B1 | | 11/2005 | Woo et al. |
| 2002/0061375 A1 | * | 5/2002 | Cartledge et al. ............ 428/36.9 |
| 2002/0164492 A1 | * | 11/2002 | Nebgen et al. ................ 428/516 |
| 2006/0205863 A1 | * | 9/2006 | Lin et al. ....................... 524/543 |
| 2008/0156728 A1 | | 7/2008 | Blickhan et al. |
| 2008/0251459 A1 | | 10/2008 | Oleszkiewicz et al. |

* cited by examiner

*Primary Examiner* — Tahseen N Khan
(74) *Attorney, Agent, or Firm* — Cook Alex Ltd.

(57) ABSTRACT

Sheets for use with medical containers are described. An example sheet for use with medical containers includes a plurality of layers. At least one of the layers includes polyolefin and the plurality of the layers comprises approximately less than 15% of at least one of a plasticizer or a low molecular weight material that is to decrease a rate of hemolysis when exposed to a blood component. At least one of the plurality of layers being modified to enable autoclavability and radio frequency sealability.

17 Claims, 3 Drawing Sheets

SHEETS FOR USE WITH MEDICAL CONTAINERS

RELATED APPLICATION

This patent claims priority to provisional patent application No. 61/255,707 filed Oct. 28, 2009, which is hereby incorporated herein by reference in its entirety.

TECHNICAL FIELD

The present patent pertains to sheets and, more particularly to sheets for use with medical containers.

BACKGROUND

Some medical containers may be used to store blood components such as, red blood cells, plasma and/or platelets. The medical containers may have a variety of properties to enable the storage of the different blood components. For example, to decrease the rate of hemolysis and, thus, increase the amount of time that the red blood cells may be stored in these medical containers, some known medical containers include plasticized polyvinyl chloride because low hemolysis has been observed in such medical containers. Medical containers used to store plasma may enable the plasma to be frozen in the medical container and subsequently thawed and medical containers used to store platelets may enable gas transmission through the medical container to support metabolic processes of the platelets.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples. Although the following discloses example systems and components that may be produced and/or fabricated using plastic, it should be noted that such systems are merely illustrative and should not be considered as limiting.

The examples described herein relate to medical containers used to store medical fluids such as, for example, blood components. The example medical containers described herein may include sheets each having a plurality of layers. One or more of the layers may include an extractable and/or non-extractable material(s) or substance(s) that, when exposed to blood and/or a blood component, may advantageously decrease the rate of red blood cell hemolysis. Specifically, in some examples, the material or substance may be a plasticizer that safely and effectively leaches into and/or interacts with blood and/or a blood component stored within the example medical containers to decrease the rate of red blood cell hemolysis during storage, for example. In contrast to some known examples, some or all of the layers may include polyolefin and relatively lower levels of plasticizer than previously thought effective.

The medical containers described herein may include opposing sheets that may be sealed using, for example, radio frequency (RF) sealing, along a peripheral edge to form a compartment that may be used to store any fluid such as, for example, red blood cells, platelets or plasma. In some examples, the example sheets may include polyolefin having relatively low levels of plasticizer or a relatively low molecular weight additive. The plasticizer or the relatively low molecular weight additive may be present in the total structure of the sheets at substantially below 15%. Additionally or alternatively, the permeability of the example sheets described herein may be tailored to a particular application to achieve optimal gas (e.g., carbon dioxide, oxygen) transmission rates, for example. For example, the example sheets may enable carbon dioxide transmission of between about 500 and 1200 cc/100 in$^2$-24 hr.-atm and oxygen transmission of between about 70 and 140 cc/100-24 hr.-atm. The examples described herein may replace some known medical containers that include Polyvinyl chloride and/or bis(2-ethylhexyl) phthalate.

Figure 1:
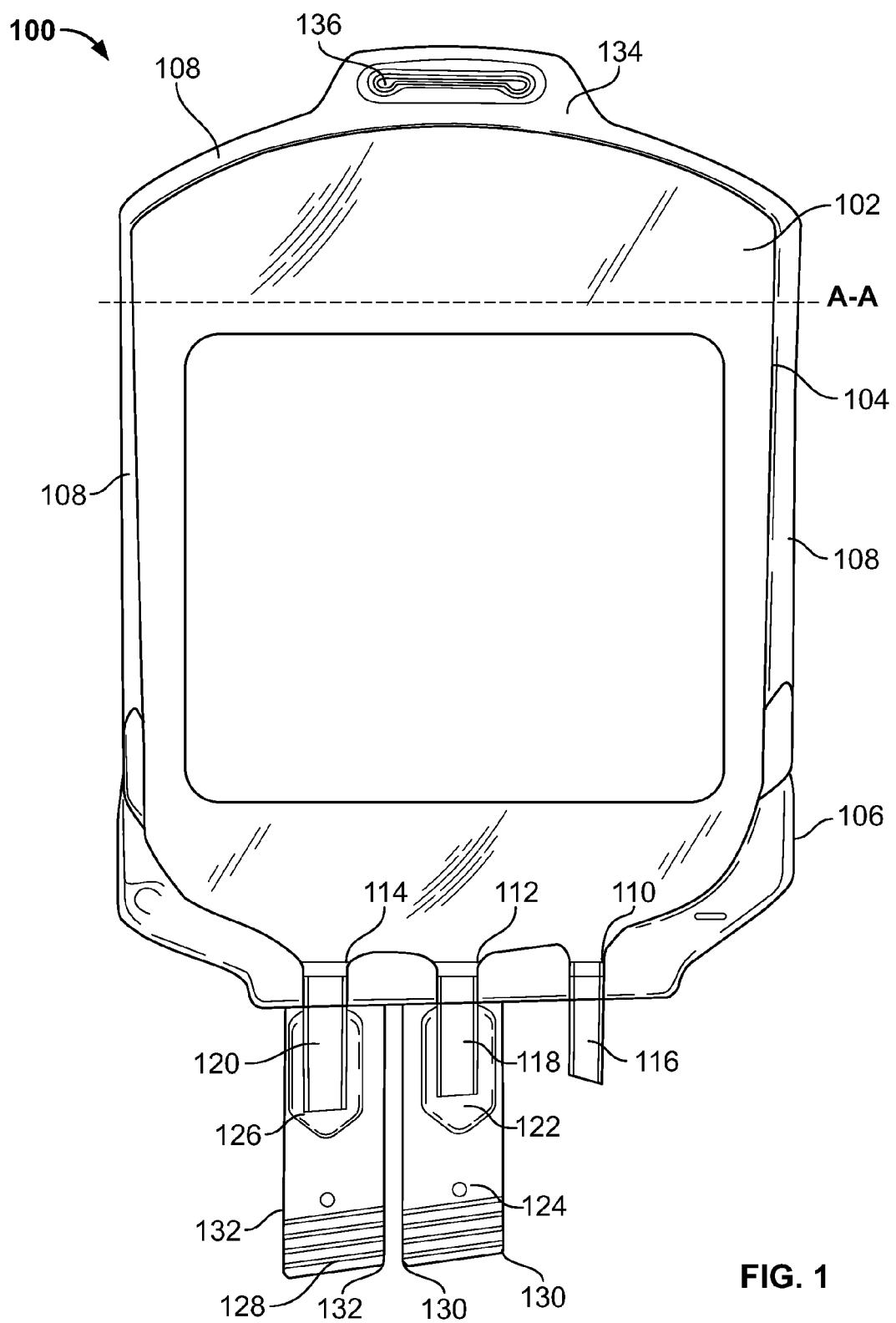
FIG. 1 depicts an example medical container.

FIG. 1 depicts an example container 100 having a compartment 102 for storage of a substance(s) and/or solution(s). In some examples, the container 100 may be used as a medical solution or storage container, a blood pack unit or for some other transfer pack application. The container 100 may be formed using a first sheet 104 and a second sheet 106 opposite the first sheet 104. As discussed in more detail below, the sheets 104 and 106 may be relatively flexible and may be made of any suitable material. To contain and prevent leakage of the substance(s) and/or solution(s) stored within the compartment 102, the sheets 104 and 106 may be sealed (e.g., heat sealed, adhesive bonding, etc.) along a peripheral edge 108 to form a substantially permanent seal between the sheets 104 and 106.

To enable access to the compartment 102, the container 100 is provided with a first opening or aperture 110, a second opening or aperture 112 and a third opening or aperture 114; however, any number of openings (e.g., 1, 2, 3, 4, etc.) may be provided instead. In this example, a first membrane port or tube 116 is positioned in the first opening 110, a second membrane port or tube 118 is positioned in the second opening 112 and a third membrane port or tube 120 is positioned in the third opening 114. However, any or all of the ports 116, 118 or 120 may be twist-off ports instead. To maintain the sterility of the second membrane port 118 during handling, a portion of the second membrane port 118 extending from the peripheral edge 108 is positioned in a chamber 122 defined by an example first tab 124. Similarly, to maintain the sterility of the third membrane port 120 during handling, a portion of the third membrane port 120 extending from the peripheral edge 108 is positioned in a chamber 126 defined by an example second tab 128. When a person wants to access either of the second or third membrane ports 118 or 120, the respective tab 124 or 128 may be separated along its peripheral edge 130 or 132.

Opposite the openings 110-114, the peripheral edge 108 includes a portion 134 that defines an aperture 136 that may utilized to suspend or hang the container 100 relative to a floor (not shown) and/or to store a tube segment(s) or a donor sample tube(s), for example.

Figure 2:
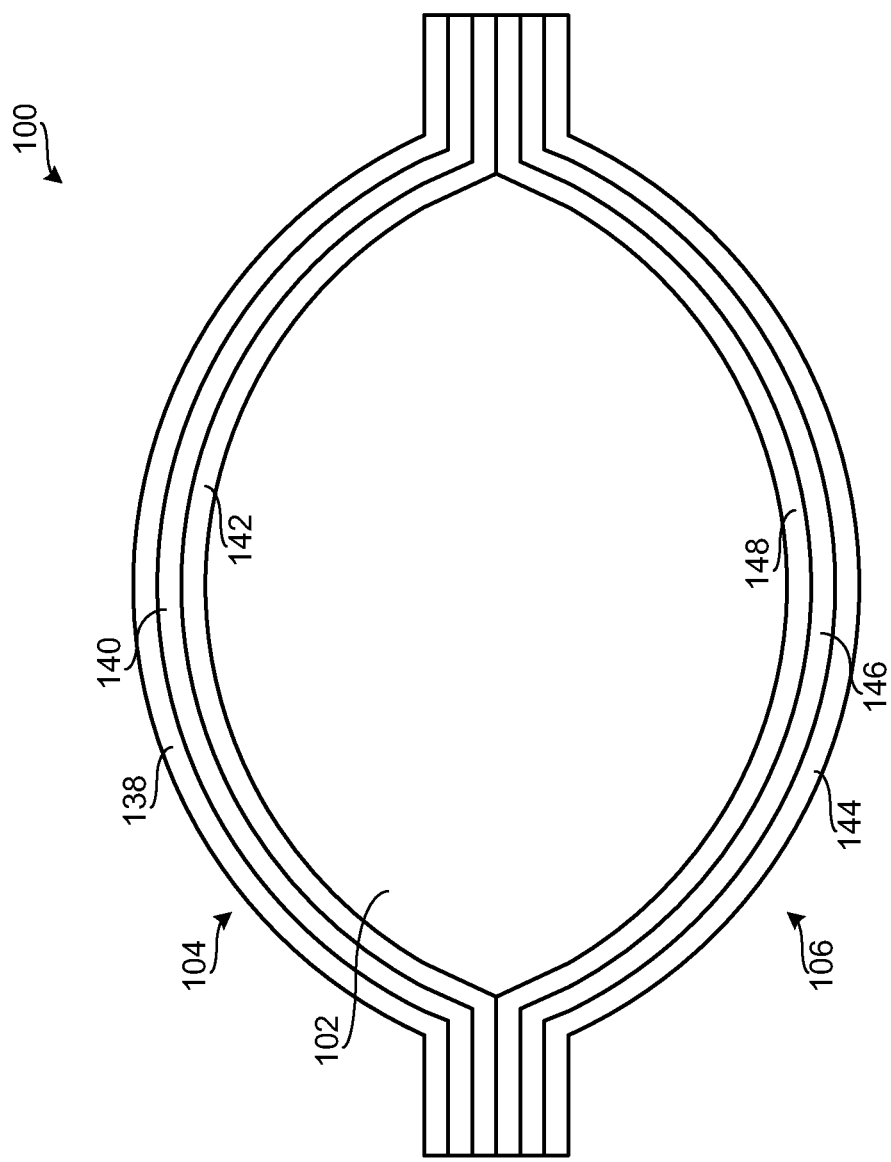
FIG. 2 depicts a cross-sectional view of the example medical container of FIG. 1 along line A-A.

FIG. 2 depicts a cross-sectional view of the container 100 along line A-A. In this example, the first sheet 104 includes a first layer 138, a second layer (e.g., a core layer) 140 and a third layer 142 and, similarly, the second sheet 106 includes a first layer 144, a second layer (e.g., a core layer) 146 and a third layer 148. However, either of the sheets 104 and/or 106 may include any other number of layers instead (e.g., 1, 2, 3, 4, etc.). The layers 138-148 may be made of the same or different materials and may have similar or different thicknesses. In some examples, the first layer 138 and 144 may be approximately 4% of the thickness of the sheet 104 or 106 or approximately 0.5 mil, the second layer 140 or 146 may be approximately 92% of the thickness of the sheet 104 or 106 or approximately 11.0 mil and the third layer 142 and 148 may be approximately 250 Kiloelectron volts (keV) and a dose of between about 75 Kilogray and 150 Kilogray or between about 60 Kilogray and 75 Kilogray.

The sheets 104 and/or 106 may be produced using a die block co-extrusion method such that the first and third layers 138 and 142 and 144 and 148 are made of the same material(s) and the second layer 140 and 146 is made of a different material(s). Some formulas that may be used to produce the sheets 104 and/or 106 are shown in table 1 and described in detail below.

TABLE 1

| Formula No. | 1 | 2 | 3 | 4 | 5 | 6 | 7 | 8 | 9 | 10 |
|---|---|---|---|---|---|---|---|---|---|---|
| First and Third Layers | | | | | | | | | | |
| ethylene vinyl acetate copolymer plastic | 20% | — | 20% | — | — | 20% | 20% | 20% | 20% | 20% |
| polypropylene copolymer | 20% | 30% | 40% | 30% | 40% | 40% | 20% | 20% | 20% | 20% |
| styrene ethylene butylene styrene block copolymer plastic | 60% | 52.50% | 30% | 52.50% | 30% | 30% | 60% | 60% | 60% | 60% |
| acetyltri-n-butyl citrate | — | 17.50% | 10% | — | — | — | — | — | — | — |
| acetyltri-n-hexyl citrate | — | — | — | 17.50% | 10% | 10% | — | — | — | — |
| polyethylene copolymer | — | — | — | — | 20% | — | — | — | — | — |
| Second Layer | | | | | | | | | | |
| ethylene vinyl acetate copolymer plastic | 100% | 100% | 100% | 100% | 100% | 100% | 96.50% | 97% | 97% | 72% |
| calcium carbonate | — | — | — | — | — | — | 0.05% | — | — | — |
| UV initiator | — | — | — | — | — | — | — | 0.09% | 0.09% | — |
| carrier resin | — | — | — | — | — | — | 3.45% | 2.91% | 2.91% | — |
| polyethylene copolymer | — | — | — | — | — | — | — | — | — | 28% | be approximately 4% of the thickness of the sheet 104 or 106 or approximately 0.5 mil. In other examples, the first layer 138 and 144 may be approximately 4% of the thickness of the sheet 104 or 106, the second layer 140 or 146 may be between about 80%-92% of the thickness of the sheet 104 or 106 and the third layer 142 and 148 may be between about 4%-16% of the thickness of the sheet 104 or 106. In some examples, the second layer 140 or 146 may be equal to or greater than between about 65% and 75% of the thickness of the sheet 104 or 106 to enable RF sealability.

In some examples, the first layer 138 and/or 144 may include a relatively low molecular weight material or plasticizer that may be readily metabolized by a patient's body to a material(s) that may be normally present in the patient's body. Some relatively low molecular weight materials or plasticizers include Citroflex® A-4 and Citroflex® A-6, for example. Additionally or alternatively, the first layer 138 and/or 144 may include a resin(s) that may be autoclaved, but will not readily cross-link when exposed to ionizing radiation. In some examples, the resins may include polypropylene and another resin that may readily absorb plasticizer. The resin that may readily absorb plasticizer may be a styrene-butadiene elastomer or any other type of thermoplastic rubber, for example. In some examples, the layers 138-148 may include approximately greater than 65% of material having glass transition temperatures below approximately −50° C.

To enable the first sheet 104 and/or the second sheet 106 to be autoclavable, the second layer 140 and/or 146 may be cross-linked using ionizing radiation, an electron beam, gamma irradiation and/or ultraviolet irradiation, for example. However, if ultraviolet irradiation is used to cross-link the second layer 140 and/or 146, the second layer 140 and/or 146 may include a UV initiator. In some examples, the sheets 104 and/or 106 may be cross-linked using an electron beam at In such examples and illustrated by formula 1 of table 1, the first and third layers 138 and 142 and 144 and 148 may be made of approximately 20% ethylene vinyl acetate copolymer plastic (e.g., Ateva® 2803), approximately 20% polypropylene copolymer (e.g., Total 6575) and approximately 60% styrene ethylene butylene styrene block copolymer plastic (e.g., Kraton® G-1652) and the second layer 140 and 146 may be made of ethylene vinyl acetate copolymer plastic (e.g., Ateva® 2803).

In other examples and illustrated by formula 2 of table 1, the first and third layers 138 and 142 and 144 and 148 may be made of approximately 52.5% styrene ethylene butylene styrene block copolymer plastic (e.g., Kraton® G-1652), approximately 17.5% acetyltri-n-butyl citrate (e.g., A-4 Citrate, Citroflex® A-4) and approximately 30% polypropylene copolymer (e.g., Total 6575) and the second layer 140 and 146 may be made of ethylene vinyl acetate copolymer plastic (e.g., Ateva® 2803). In some examples, red bloods cells that were stored in the container 100 made of the above described material(s) had an average hemolysis of approximately 1.04% and an approximate Ph of 6.3 after 42-days. Additionally, example results indicate that the container 100 made of the above described material(s) may have an oxygen transmission rate of approximately 128 or 118 cubic centimeter (cc)/100 square (sq) inches (in) in 24-hours at atmospheric pressure and a carbon dioxide transmission rate of approximately 1057 cc/100 sq. in. in 24-hours at atmospheric pressure, both of which are comparable to some known materials being used for medical containers.

In other examples and illustrated by formula 3 of table 1, the first and third layers 138 and 142 and 144 and 148 may be made of approximately 30% styrene ethylene butylene styrene block copolymer plastic (e.g., Kraton® G-1652), approximately 10% acetyltri-n-butyl citrate (e.g., A-4 Citrate, Citroflex® A-4), approximately 40% polypropylene copolymer (e.g., Total 6575) and approximately 20% ethylene vinyl acetate copolymer plastic (e.g., Ateva® 2803) and the second layer 140 and 146 may be made of ethylene vinyl acetate copolymer plastic (e.g., Ateva® 2803). In some examples, the container 100 made of the above described material(s) may have an oxygen transmission rate of approximately 117 or 113 cc/100 sq. in. in 24-hours at atmospheric pressure and a carbon dioxide transmission rate of approximately 1035 cc/100 sq. in. in 24-hours at atmospheric pressure, both of which are comparable to some known materials being used for medical containers.

In other examples and illustrated by formula 4 of table 1, the first and third layers 138 and 142 and 144 and 148 may be made of approximately 52.5% styrene ethylene butylene styrene block copolymer plastic (e.g., Kraton® G-1652), approximately 17.5% acetyltri-n-hexyl citrate (e.g., A-6 Citrate, Citroflex® A-6) and approximately 30% polypropylene copolymer (e.g., Total 6575) and the second layer 140 and 146 may be made of ethylene vinyl acetate copolymer plastic (e.g., Ateva® 2803). In some examples, red bloods cells that were stored in the container 100 made of the above described material(s) had an average hemolysis of approximately 0.79% and an approximate Ph of 6.3 after 42-days.

In other examples and illustrated by formula 5 of table 1, the first and third layers 138 and 142 and 144 and 148 may be made of approximately 30% styrene ethylene butylene styrene block copolymer plastic (e.g., Kraton® G-1652), approximately 10% acetyltri-n-hexyl citrate (e.g., A-6 Citrate, Citroflex® A-6), approximately 40% polypropylene copolymer (e.g., Total 6575) and approximately 20% polyethylene copolymer, very low density polyethylene or polyalphaolefin plastic (e.g., Tafiner® A4085X) and the second layer 140 and 146 may be made of ethylene vinyl acetate copolymer plastic (e.g., Ateva® 2803).

In other examples and illustrated by formula 6 of table 1, the first and third layers 138 and 142 and 144 and 148 may be made of approximately 30% styrene ethylene butylene styrene block copolymer plastic (e.g., Kraton® G-1652), approximately 10% acetyltri-n-hexyl citrate (e.g., A-6 Citrate, Citroflex® A-6), approximately 40% polypropylene copolymer (e.g., Total 6575) and approximately 20% ethylene vinyl acetate copolymer plastic (e.g., Ateva® 2803) and the second layer 140 and 146 may be made of ethylene vinyl acetate copolymer plastic (e.g., Ateva® 2803).

In other examples and illustrated by formula 7 of table 1, the first and third layers 138 and 142 and 144 and 148 may be made of approximately 20% ethylene vinyl acetate copolymer plastic (e.g., Ateva® 2803), approximately 20% polypropylene copolymer (e.g., Total 6575) and approximately 60% styrene ethylene butylene styrene block copolymer plastic (e.g., Kraton® G-1652) and the second layer 140 and 146 may be made of approximately 96.5% ethylene vinyl acetate copolymer plastic (e.g., Ateva® 2803) and approximately 3.45% of a carrier resin containing approximately 1.5% calcium carbonate (e.g., approximately 0.05% of the second layer 140 and 146).

In other examples and illustrated by formula 8 of table 1, the first and third layers 138 and 142 and 144 and 148 may be made of approximately 20% ethylene vinyl acetate copolymer plastic (e.g., Ateva® 2803), approximately 20% polypropylene copolymer (e.g., Total 6575) and approximately 60% styrene ethylene butylene styrene block copolymer plastic (e.g., Kraton® G-1652) and the second layer 140 and 146 may be made of approximately 97% ethylene vinyl acetate copolymer plastic (e.g., Ateva® 2803) and approximately 3% of a carrier resin containing approximately 3% of a UV initiator (e.g., approximately 0.09% of the second layer 140 and 146). Some UV initiators that may be used include polymeric thioxanthone derivative, Genopol® TX-1, Ciba® Iracure® 819, Ciba® Iracure® 369, 2,4,6-trimethylbenzoyl-diphenyl phosphine oxide, IGM Omnirad TPO, di-functional benzophenone photoinitiator, IGM Omnipol BP, di-functional thioxanthone photoinitiator and/or IGM Omnipol TX, for example.

In other examples and illustrated by formula 9 of table 1, the first and third layers 138 and 142 and 144 and 148 may be made of approximately 20% ethylene vinyl acetate copolymer plastic (e.g., Ateva® 2803), approximately 20% polypropylene copolymer (e.g., Total 6575) and approximately 60% styrene ethylene butylene styrene block copolymer plastic (e.g., Kraton® G-1652) and the second layer 140 and 146 may be made of approximately 97% ethylene vinyl acetate copolymer plastic (e.g., Ateva® 2803), approximately 2.91% carrier resin (e.g., a blend of ethylene vinyl acetate and Kraton® G-1652) and approximately 0.09% UV initiator.

In other examples and illustrated by formula 10 of table 1, the first and third layers 138 and 142 and 144 and 148 may be made of approximately 20% ethylene vinyl acetate copolymer plastic (e.g., Ateva® 2803), approximately 20% polypropylene copolymer (e.g., Total 6575) and approximately 60% styrene ethylene butylene styrene block copolymer plastic (e.g., Kraton® G-1652) and the second layer 140 and 146 may be made of approximately 72% ethylene vinyl acetate copolymer plastic (e.g., Ateva® 2803) and approximately 28% polyethylene copolymer, very low density polyethylene or polyalphaolefin plastic (e.g., Tafiner® A04085X).

While the above examples describe the first and third layers 138 and 142 and 144 and 148 being made of the same materials, the first and third layers 138 and 142 and 144 and 148 may be made of different materials. In such examples, the first layer 138 and 144 may be an outer layer and the third layer 142 and 148 may include sealing properties to enable the sheets 104 and 106 to be sealed together along the peripheral edge 108. The first layer 138 and 144 may be approximately 15% of the total thickness of the sheets 104 and 106, the second layer 146 and 140 may be approximately 80% of the total thickness of the sheets 104 and 106 and the third layer 142 and 148 may be approximately 5% of the total thickness of the sheets 104 and 106. Some alternative formulas that may be used to produce the sheets 104 and/or 106 are shown in table 2 and described in detail below.

TABLE 2

| Formula No. | 1 | 2 | 3 | 4 | 5 | 6 | 7 | 8 |
|---|---|---|---|---|---|---|---|---|
| First Layer | | | | | | | | |
| styrene ethylene butylene styrene block copolymer plastic | 20% | 25% | 20% | 20% | 20% | 30% | 30% | 25% |
| acetyltri-n-hexyl citrate | 5% | 5% | — | — | — | — | — | — |

TABLE 2-continued

| Formula No. | 1 | 2 | 3 | 4 | 5 | 6 | 7 | 8 |
|---|---|---|---|---|---|---|---|---|
| polypropylene | 75% | 70% | 80% | 80% | 80% | 70% | 70% | 75% |
| Second Layer | | | | | | | | |
| ethylene vinyl acetate | 99.91% | 99.91% | 99.91% | 99.91% | 99.91% | 99.91% | 97.91% | 97.91% |
| UV initiator | 0.09% | 0.09% | 0.09% | 0.09% | 0.09% | 0.09% | 0.09% | 0.09% |
| polypropylene | — | — | — | — | — | — | 1.30% | 1.30% |
| styrene ethylene butylene styrene block copolymer plastic | — | — | — | — | — | — | 0.60% | 0.60% |
| acetyltri-n-hexyl citrate | — | — | — | — | — | — | 0.10% | 0.10% |
| Third Layer | | | | | | | | |
| styrene ethylene butylene styrene block copolymer plastic | 20% | 20% | 20% | 15% | 15% | 15% | 15% | 15% |
| acetyltri-n-hexyl citrate | 20% | 10% | 20% | 25% | — | 25% | 25% | 25% |
| polypropylene | 60% | 70% | 60% | 60% | 60% | 60% | 60% | 60% |
| plasticizer | — | — | — | — | 25% | — | — | — |

In some examples and illustrated by formula 1 of table 2, the first layer 138 and 144 may be made of approximately 20% styrene ethylene butylene styrene block copolymer plastic (e.g., Kraton® G-1652), approximately 5% acetyltri-n-hexyl citrate (e.g., A-6 Citrate, Citroflex® A-6) and approximately 75% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 20% styrene ethylene butylene styrene block copolymer plastic (e.g., Kraton® G-1652), approximately 20% acetyltri-n-hexyl citrate (e.g., A-6 Citrate, Citroflex® A-6) and approximately 60% polypropylene.

In such examples, the sheet 104 and/or 106 may be made of approximately 79.928% ethylene vinyl acetate copolymer containing approximately 28% vinyl acetate, approximately 0.072% UV initiator, approximately 4% Kraton® G-1652, approximately 1.75% acetyltri-n-hexyl citrate and approximately 14.25% polypropylene. The percentage of the components or materials in each of the sheets 104 and/or 106 may be advantageously utilized to roughly estimate at least some physical properties of the sheet 104 or 106 such as, for example, gas transmission.

In other examples and illustrated by formula 2 of table 2, the first layer 138 and 144 may be made of approximately 25% styrene ethylene butylene styrene block copolymer plastic (e.g., Kraton® G-1652), approximately 5% acetyltri-n-hexyl citrate (e.g., A-6 Citrate, Citroflex® A-6) and approximately 70% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 20% styrene ethylene butylene styrene block copolymer plastic (e.g., Kraton® G-1652), approximately 10% acetyltri-n-hexyl citrate (e.g., A-6 Citrate, Citroflex® A-6) and approximately 70% polypropylene.

In such examples, the sheet 104 and/or 106 may be made of approximately 79.928% ethylene vinyl acetate copolymer containing approximately 28% vinyl acetate, approximately 0.072% UV initiator, approximately 4.75% Kraton® G-1652, approximately 1.25% acetyltri-n-hexyl citrate and approximately 14% polypropylene.

In other examples and illustrated by formula 3 of table 2, the first layer 138 and 144 may be made of approximately 20% styrene ethylene butylene styrene block copolymer plastic (e.g., Kraton® G-1652) and approximately 80% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 20% styrene ethylene butylene styrene block copolymer plastic (e.g., Kraton® G-1652), approximately 20% acetyltri-n-hexyl citrate (e.g., A-6 Citrate, Citroflex® A-6) and approximately 60% polypropylene.

In such examples, the sheet 104 and/or 106 may be made of approximately 79.928% ethylene vinyl acetate copolymer containing approximately 28% vinyl acetate, approximately 0.072% UV initiator, approximately 4% Kraton® G-1652, approximately 1% acetyltri-n-hexyl citrate and approximately 15% polypropylene.

In other examples and illustrated by formula 4 of table 2, the first layer 138 and 144 may be made of approximately 20% styrene ethylene butylene styrene block copolymer plastic (e.g., Kraton® G-1652) and approximately 80% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 15% styrene ethylene butylene styrene block copolymer plastic (e.g., Kraton® G-1652), approximately 25% acetyltri-n-hexyl citrate (e.g., A-6 Citrate, Citroflex® A-6) and approximately 60% polypropylene.

In such examples, the sheet 104 and/or 106 may be made of approximately 79.928% ethylene vinyl acetate copolymer containing approximately 28% vinyl acetate, approximately 0.072% UV initiator, approximately 3.75% Kraton® G-1652, approximately 1.25% acetyltri-n-hexyl citrate and approximately 15% polypropylene.

In other examples and illustrated by formula 5 of table 2, the first layer 138 and 144 may be made of approximately 20% styrene ethylene butylene styrene block copolymer plastic (e.g., Kraton® G-1652) and approximately 80% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 15% styrene ethylene butylene styrene block copolymer plastic (e.g., Kraton® G-1652), approximately 25% plasticizer (e.g., di(isononyl)cyclohexane-1,2-dicarboxylate, Hexamoll® DINCH) and approximately 60% polypropylene.

In such examples, the sheet 104 or 106 may be made of approximately 79.928% ethylene vinyl acetate copolymer containing approximately 28% vinyl acetate, approximately 0.072% UV initiator, approximately 3.75% Kraton® G-1652, approximately 1.25% Hexamoll® DINCH and approximately 15% polypropylene.

In other examples and illustrated by formula 6 of table 2, the first layer 138 and 144 may be made of approximately 30% styrene ethylene butylene styrene block copolymer plastic (e.g., Kraton® G-1652) and approximately 70% polypropylene. The second layer 140 and 146 may be made of approximately 99.91% ethylene vinyl acetate (e.g., ethylene vinyl acetate copolymer containing approximately 28% vinyl acetate) and approximately 0.09% UV initiator (e.g., polymeric thioxanthone derivative, Genopol® TX-1, UV concentrate) and the third layer 142 and 148 may be made of approximately 15% styrene ethylene butylene styrene block copolymer plastic (e.g., Kraton® G-1652), approximately 25% acetyltri-n-hexyl citrate (e.g., A-6 Citrate, Citroflex® A-6) and approximately 60% polypropylene.

In such examples, the sheet 104 or 106 may be made of approximately 79.928% ethylene vinyl acetate copolymer containing approximately 28% vinyl acetate, approximately 0.072% UV initiator, approximately 5.25% Kraton® G-1652, approximately 1.25% acetyltri-n-hexyl citrate and approximately 13.5% polypropylene.

In other examples and illustrated by formula 7 of table 2, the first layer 138 and 144 may be made of approximately 30% styrene ethylene butylene styrene block copolymer plastic (e.g., Kraton® G-1652) and approximately 70% polypropylene. The second layer 140 and 146 may be made of approximately 97.91% ethylene vinyl acetate (e.g., ethylene vinyl acetate copolymer containing approximately 28% vinyl acetate), approximately 1.3% polypropylene, approximately 0.6% styrene ethylene butylene styrene block copolymer plastic (e.g., Kraton® G-1652), approximately 0.1% acetyl-tri-n-hexyl citrate (e.g., A-6 Citrate, Citroflex® A-6) and approximately 0.09% UV initiator (e.g., polymeric thioxanthone derivative, Genopol® TX-1, UV concentrate). The third layer 142 and 148 may be made of approximately 15% styrene ethylene butylene styrene block copolymer plastic (e.g., Kraton® G-1652), approximately 25% acetyltri-n-hexyl citrate (e.g., A-6 Citrate, Citroflex® A-6) and approximately 60% polypropylene.

In such examples, the sheet 104 or 106 may be made of approximately 78.328% ethylene vinyl acetate copolymer containing approximately 28% vinyl acetate, approximately 0.072% UV initiator, approximately 5.73% Kraton® G-1652, approximately 1.33% acetyltri-n-hexyl citrate and approximately 14.54% polypropylene.

In other examples and illustrated by formula 8 of table 2, the first layer 138 and 144 may be made of approximately 25% styrene ethylene butylene styrene block copolymer plastic (e.g., Kraton® G-1652) and approximately 75% polypropylene. The second layer 140 and 146 may be made of approximately 97.91% ethylene vinyl acetate (e.g., ethylene vinyl acetate copolymer containing approximately 28% vinyl acetate), approximately 1.3% polypropylene, approximately 0.6% styrene ethylene butylene styrene block copolymer plastic (e.g., Kraton® G-1652), approximately 0.1% acetyl-tri-n-hexyl citrate (e.g., A-6 Citrate, Citroflex® A-6) and approximately 0.09% UV initiator (e.g., polymeric thioxanthone derivative, Genopol® TX-1, UV concentrate). The third layer 142 and 148 may be made of approximately 15% styrene ethylene butylene styrene block copolymer plastic (e.g., Kraton® G-1652), approximately 25% acetyltri-n-hexyl citrate (e.g., A-6 Citrate, Citroflex® A-6) and approximately 60% polypropylene.

In such examples, the sheet 104 or 106 may be made of approximately 78.328% ethylene vinyl acetate copolymer containing approximately 28% vinyl acetate, approximately 0.072% UV initiator, approximately 4.98% Kraton® G-1652, approximately 1.33% acetyltri-n-hexyl citrate and approximately 15.29% polypropylene.

Figure 3:
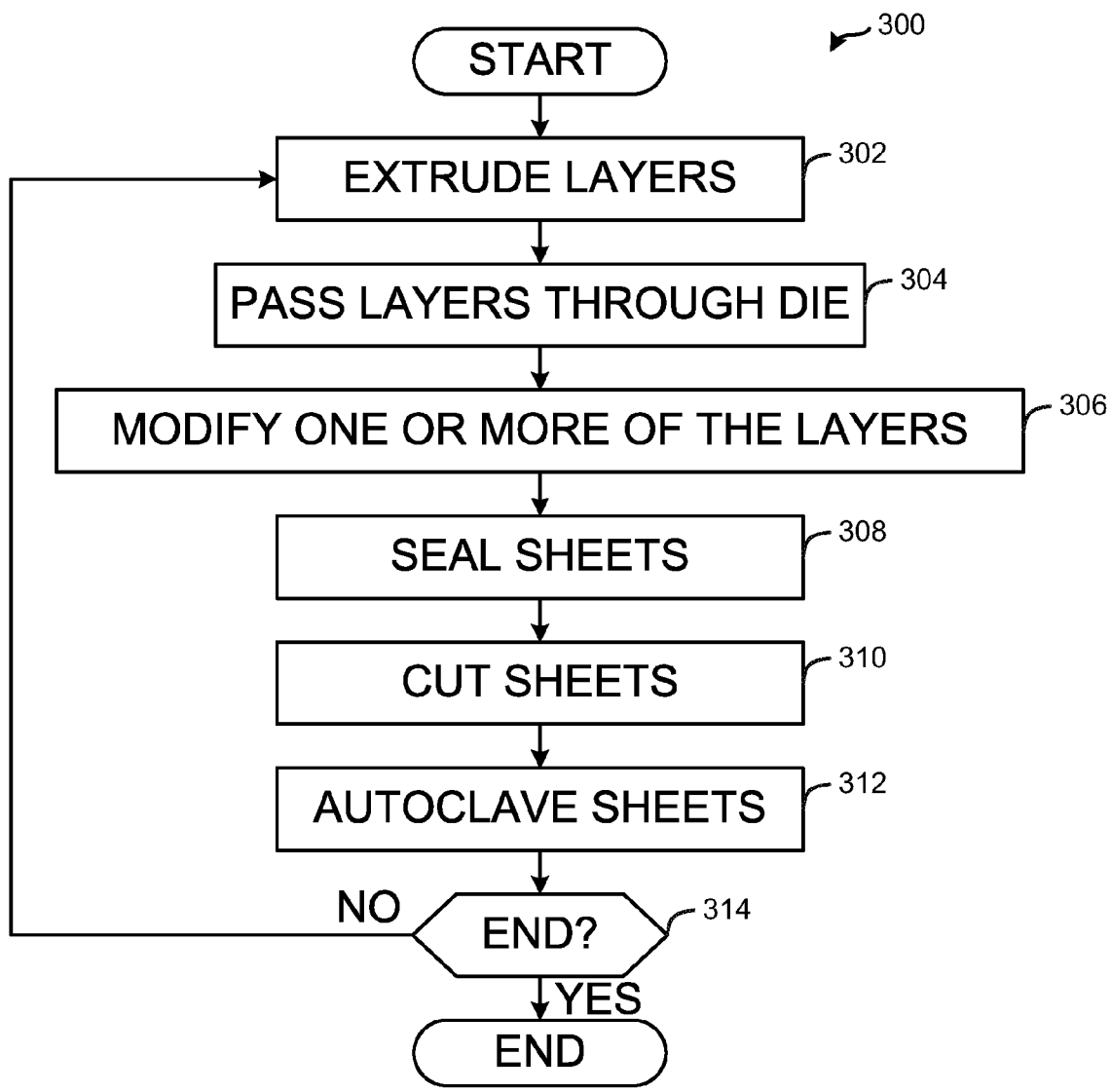
FIG. 3 is a flowchart of an example process that may be performed to produce the examples described herein.

FIG. 3 depicts an example flow diagram representative of processes that may be used in a manufacturing and/or assembly process to produce the examples described herein. The example processes of FIG. 3 may be driven using a processor, a controller and/or any other suitable processing device. Although the example processes of FIG. 3 are described with reference to the flow diagram of FIG. 3, other methods of implementing the processes of FIG. 3 may be employed. For example, the order of execution of the blocks may be changed, and/or some of the blocks described may be changed, eliminated, sub-divided, or combined. Additionally, any or all of the example processes of FIG. 3 may be performed sequentially and/or in parallel.

FIG. 3 relates to an example process 300 that may be used to produce example sheets and/or example containers as described herein. At block 302, the process 300 extrudes layers. In some examples, the process 300 may extrude three layers having an ABC structure. In other examples, the process 300 may extrude three layers having an ABA structure. However, any other structure or number of layers may be extruded instead.

At block 304, the layers pass through a die (e.g., a flat film die). In some examples, the layers may come together prior to or just as the layers are entering the die. In other examples, the layers may come together after entering the die.

At block 306, one or more of the layers are modified by, for example, cross-linking. The second layer (e.g., the core layer) may include EVA and may be cross-linked using UV irradiation, for example. UV irradiation may ensure the second layer is cross-linked; however, the first and/or third layer may be substantially unaffected. The second layer (e.g., the core layer) may include EVA and an initiator and may be cross-linked using ionizing radiation, for example.

In some examples, layers may be cross-linked in-line with the extrusion process as, for example, the film is being wound onto a roller. In some examples, the layers may be cross-linked downstream from the extrusion process if, for example, an off-line slitting operation is being performed. However, the layers may be cross-linked at any time after extrusion.

At block 308, one or more sheets are sealed together to form, for example, a container. In some examples, the sheets are sealed together using a die and/or a sealing method such as radio frequency (RF) sealing, heat sealing etc. At block 310, the process 300 cuts the surrounding sheet from around the container.

At block 312, the sheets and/or the container may be autoclaved and at block 314 the example process 300 determines whether or not to move to block 302. Otherwise the example process 300 is ended.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed:

1. An ultraviolet radiation cross-linked flexible sheet comprising a plurality of layers including
    a first layer comprising a block copolymer and a polypropylene copolymer,
    a second core layer comprising at least approximately 97% ethylene vinyl acetate, and
    a third layer comprising a block copolymer, a polypropylene copolymer and a hemolysis-suppressing plasticizer or low molecular weight material,
    wherein said sheet as a whole comprises an amount of plasticizer or low molecular weight material that is less than 15% but sufficient to decrease a rate of hemolysis when exposed to a blood component, and
    wherein said cross-linked sheet is radio frequency sealable to another of said cross-linked sheets to form an autoclavable medical container after said cross-linking.

2. The sheet of claim 1, wherein the first layer comprises approximately 4% of a thickness of the sheet, the second layer comprises between about 80%-92% of the thickness of the sheet, and the third layer comprises between about 4%-16% of the thickness of the sheet.

3. The sheet of claim 1, wherein the low molecular weight material has a molecular weight of less than approximately 2000.

4. The sheet of claim 1, wherein said second core layer comprises a ultraviolet initiator to enable cross-linking of said layer using ultraviolet irradiation.

5. The sheet of claim 1, wherein the plurality of layers allows for carbon dioxide transmission of between about 500 and 1200 atm cc/100 in 2-24 hr.-atm and oxygen transmission of between about 70 and 140 cc/100-24 in, 2-24 hr.-atm.

6. The sheet of claim 1, wherein the plurality of layers comprises approximately greater than 65% of material comprising glass transition temperatures below approximately −50 degrees C.

7. The sheet of claim 1, wherein said second core layer is cross-linked to enable autoclavability and radio frequency sealability of said sheet.

8. The sheet of claim 1 wherein said first for third layer further comprises ethylene vinyl acetate.

9. The sheet of claim 1 wherein said ethylene vinyl acetate in said second core layer has at least 18% vinyl acetate comonomer content.

10. The sheet of claim 1 wherein said block copolymer comprises a styrene ethylene butylene styrene copolymer.

11. The sheet of claim 10 wherein said styrene ethylene butylene styrene copolymer comprises between about 15-60% of said first or third layers.

12. The sheet of claim 11 wherein said first layer comprises about 30-60% of said styrene ethylene butylene styrene copolymer.

13. The sheet of claim 11 wherein said third layer comprises about 30-60% of said styrene ethylene butylene styrene copolymer.

14. The sheet of claim 1 wherein said plasticizer comprises a citrate ester.

15. The sheet of claim 14 wherein said citrate ester is selected from acetyltri-n-hexyl citrate and acetyltri-n-butyl citrate.

16. The sheet of claim 14 wherein said first layer further comprises a plasticizer.

17. The sheet of claim 16 wherein said citrate ester comprises about 5% to 25% of said first or third layer.

* * * * *